United States Patent
Asano et al.

(10) Patent No.: US 11,206,771 B2
(45) Date of Patent: Dec. 28, 2021

(54) VEGETATION EFFECT CALCULATION DEVICE, VEGETATION EFFECT CALCULATION SYSTEM, AND STORAGE MEDIUM STORING VEGETATION EFFECT CALCULATION PROGRAM

(71) Applicant: NEC CORPORATION, Tokyo (JP)

(72) Inventors: Sho Asano, Tokyo (JP); Shinji Kasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 274 days.

(21) Appl. No.: 16/498,170

(22) PCT Filed: Mar. 19, 2018

(86) PCT No.: PCT/JP2018/010762
§ 371 (c)(1),
(2) Date: Sep. 26, 2019

(87) PCT Pub. No.: WO2018/180686
PCT Pub. Date: Oct. 4, 2018

(65) Prior Publication Data
US 2020/0029512 A1    Jan. 30, 2020

(30) Foreign Application Priority Data
Mar. 31, 2017   (JP) .............................. JP2017-071073

(51) Int. Cl.
*A01G 20/00* (2018.01)
*A01G 7/00* (2006.01)
*E02D 17/20* (2006.01)

(52) U.S. Cl.
CPC .............. *A01G 20/00* (2018.02); *A01G 7/00* (2013.01); *E02D 17/20* (2013.01)

(58) Field of Classification Search
CPC ........... A01G 20/00; A01G 7/00; E02D 17/20
See application file for complete search history.

(56) References Cited

U.S. PATENT DOCUMENTS

2018/0356339 A1* 12/2018 Jiang .................... G01N 21/359

FOREIGN PATENT DOCUMENTS

| CN | 201247085 Y | 5/2009 |
| CN | 104217103 A | 12/2014 |

(Continued)

OTHER PUBLICATIONS

International Search Report in International Application No. PCT/JP2018/010762, dated May 1, 2018.

(Continued)

*Primary Examiner* — Monica L Barlow
*Assistant Examiner* — Aaron M Rodziwicz
(74) *Attorney, Agent, or Firm* — Sughrue Mion, PLLC

(57) ABSTRACT

A vegetation effect calculation device includes: a memory configured to store instructions; and at least one processor configured to execute the instructions to: acquire a moisture content of a slope, a relational expression between the moisture content and an adhesion of soil in the slope, and a vegetation adhesion that is an adhesion of vegetation abundantly growing in the slope; calculate a correction value, using the acquired moisture content of the slope, and the acquired relational expression between the moisture content and the adhesion of the soil; and calculate a corrected vegetation adhesion, using the acquired vegetation adhesion, and the calculated correction value.

4 Claims, 4 Drawing Sheets

(56) References Cited

FOREIGN PATENT DOCUMENTS

| | | | |
|---|---|---|---|
| CN | 104376216 A | | 2/2015 |
| CN | 105052438 A | | 11/2015 |
| CN | 105352893 A | | 2/2016 |
| CN | 103679202 B | * | 4/2017 |
| CN | 106771089 A | * | 5/2017 |
| CN | 108151719 B | * | 7/2019 |
| JP | 2016-216989 A | | 12/2016 |
| WO | 2016/027291 A1 | | 2/2016 |
| WO | 2017/047061 A1 | | 3/2017 |

OTHER PUBLICATIONS

Written Opinion in International Application No. PCT/JP2018/010762, dated May 1, 2018.
Ushio Kurokawa et al., "Review of simulation technique for development and collapse of topography, soil, and vegetation", The Japan Society of Erosion Control Engineering, Research Presentation Abstracts of Japan Society of Erosion Control Engineering, May 2013, pp. B390-B391 (2 pages total).
Hisashi Imai, "Study of Potential of Tree Roots for Prevention of Shallow Slope Failure", Technical research report of Hazama Corporation, Dec. 26, 2008, vol. 40, pp. 34-52 (19 pages total).
Fujiya Komamura, "Effects of vegetation on preventing slope erosion and collapse", The Japanese Association of The Revegetation Technology, Feb. 9, 2011, vol. 5, No. 2, pp. 9-13 (5 pages total).
Yasuhiro Shuin, "Regarding effects of vegetation on occurrence of outer layer collapse", Journal of the Japan Society of Erosion Control Engineering, the Japan Society of Erosion Control Engineering, Apr. 30, 2010, vol. 55, No. 1, pp. 71-78 (8 pages total).
Communication dated Nov. 24, 2018, from the Intellectual Property Office of Taiwan in Application No. 107109537.
Inagaki Hideki, "Geotechnology Study of Slope Stability Effects by Vegetation", Society of Afforestation Study, Collected Papers in Afforestation Study Presentation, Jul. 1, 2011, vol. 50, pp. 87-110 (20 pages total).

* cited by examiner

VEGETATION EFFECT CALCULATION DEVICE, VEGETATION EFFECT CALCULATION SYSTEM, AND STORAGE MEDIUM STORING VEGETATION EFFECT CALCULATION PROGRAM

CROSS REFERENCE TO RELATED APPLICATIONS

This application is a National Stage of International Application No. PCT/JP2018/010762, filed on Mar. 19, 2018, which claims priority from Japanese Patent Application No. 2017-071073, filed on Mar. 31, 2017, the contents of all of which are incorporated herein by reference in their entirety.

TECHNICAL FIELD

The present disclosure relates to a stability analysis of a slope, and particularly relates to a technique for quantifying a vegetation effect in a slope failure.

BACKGROUND ART

In construction of a road or a railway, land formation, and construction of a dam and a bank, an artificial slope is formed by cutting or banking. Further, many buildings are present near a natural slope in a mountainous region or on a hilly terrain because the mountainous region and the hilly terrain account for approximately 70% of the land in Japan. The slope carries a danger of a slope failure (a landslip and a landslide).

As one of techniques for avoiding or reducing a danger of such a slope failure, a slope stability analysis is utilized. The slope stability analysis is a technique for checking stability of a slope by analyzing a balance between sliding force of a certain object on the slope and resisting force by friction. The slope stability analysis includes a method such as a Fellenius method, a Janbu method, and a Bishop method.

It has been experimentally confirmed that the stability of the slope changes, depending on a content of moisture contained in soil.

Moreover, in a natural slope, not only uniform soil but also vegetation such as trees and the like exist. There is a possibility that the stability of the slope is changed by the above-described vegetation.

CITATION LIST

Patent Literature

PTL 1: International Publication No. WO2016/027291

SUMMARY OF INVENTION

Technical Problem

PTL 1 describes a technique for calculating a parameter of soil, based on a characteristic (a clod weight, an internal frictional angle, adhesion) of the soil and gap water pressure (a measurement value previously acquired by experiment) between soil particles, and calculating stability of a slope by performing a slope stability analysis from the calculated parameter of the soil and an amount of moisture (an instant measurement value by a moisture sensor buried in the soil) in the soil.

In the technique described in PTL 1, it is assumed that a slope is uniform soil for performing a slope stability analysis. In other words, an effect of vegetation on stability of a slope cannot be quantified in the technique described in PTL 1.

As one of parameters indicating the above-described effect on the stability of the slope by the vegetation, there is a vegetation adhesion. The vegetation adhesion is a force that joins soil layers. The vegetation adhesion may be referred to as a soil binding force or a binding force.

It is considered that since the stability of the slope changes, depending on the content of moisture contained in the soil, the vegetation adhesion also changes, depending on the moisture content. In this case, in order to perform more precise slope stability analysis, it is necessary to calculate changes of the vegetation adhesion by the moisture content.

An object of the disclosed invention is to provide a device and the like that calculates changes in an effect on stability of a slope by vegetation, depending on a moisture content.

Solution to Problem

A vegetation effect calculation device according to the disclosed invention includes:

an input/output (I/O) unit that acquires a moisture content of a slope, a relational expression between the moisture content and an adhesion of soil in the slope, and a vegetation adhesion that is an adhesion of vegetation abundantly growing in the slope;

a correction value calculation unit that calculates a correction value, using the acquired moisture content of the slope, and the acquired relational expression between the moisture content and the adhesion of the soil; and a correction unit that calculate a corrected vegetation adhesion, using the acquired vegetation adhesion, and the calculated correction value.

A vegetation effect calculation system according to the disclosed invention includes:

a storage unit that stores a relational expression between a moisture content and an adhesion of soil for each slope, an optimum moisture content ratio for each slope, and a vegetation adhesion for each slope in advance;

an acquisition unit that acquires a moisture content and a vegetation adhesion of a slope, and records the same on the storage unit;

a vegetation effect calculation device having an I/O unit, a correction value calculation unit, and a correction unit; and a slope stability analysis device, wherein the acquisition unit acquires the moisture content of the slope, the relational expression between the moisture content and the adhesion of the soil in the slope, and the vegetation adhesion that is an adhesion of vegetation abundantly growing on the slope, the correction calculation unit calculates a correction value, using the moisture content of the slope, and the relational expression between the moisture content and the adhesion of the soil, the moisture content and the relational expression having been acquired, the correction unit calculates a corrected vegetation adhesion, using the acquired vegetation adhesion, and the calculated correction value, and the slope stability analysis device calculates a safety factor in the slope, using the corrected vegetation adhesion.

A method for calculating a vegetation effect according to the disclosed invention, includes:

acquiring a moisture content of a slope, a relational expression between the moisture content and an adhesion of soil in the slope, and a vegetation adhesion that is an adhesion of vegetation abundantly growing on the slope;

calculating a correction value, using the acquired moisture content of the slope, and the acquired relational expression between the moisture content and the adhesion of the soil; and calculating a corrected vegetation adhesion, using the acquired vegetation adhesion, and the calculated correction value.

A storage medium that stores a program according to the disclosed invention, the program configured to cause a computer to function as:

means for acquiring a moisture content of a slope, a relational expression between the moisture content and an adhesion of soil in the slope, and a vegetation adhesion that is an adhesion of vegetation abundantly growing on the slope;

means for calculating a correction value, using the acquired moisture content of the slope, and the acquired relational expression between the moisture content and the adhesion of the soil; and means for calculating a corrected vegetation adhesion, using the acquired vegetation adhesion, and the calculated correction value.

Advantageous Effects of Invention

According to the disclosed invention, there can be provided a device and the like that can calculate changes in effect on stability of a slope by vegetation, depending on a moisture content.

EXAMPLE EMBODIMENTS

Figure 1:
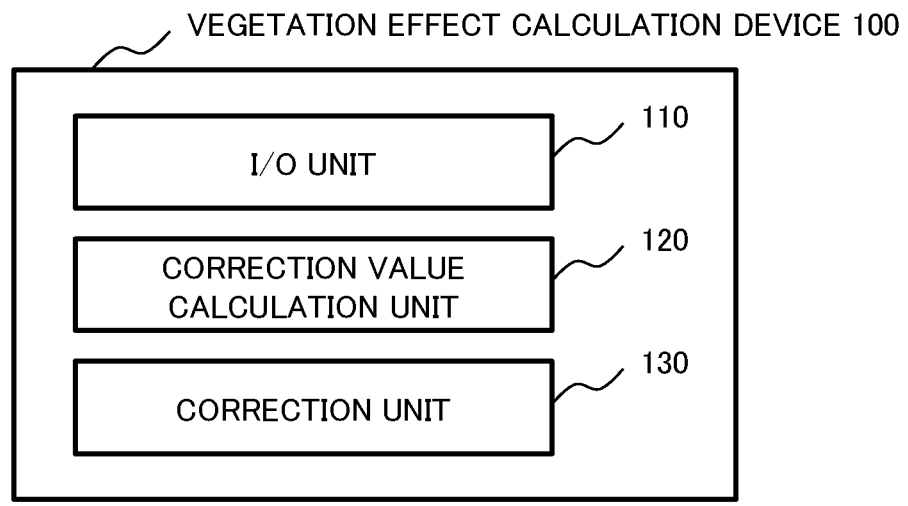
FIG. 1 is a block diagram illustrating a functional configuration of a vegetation effect calculation device 100 according to a first example embodiment.

Hereinafter, referring to the drawings, example embodiments will be described in detail. Note that in the following description, components having the same function are denoted by the same reference sign, and description thereof may be omitted.

FIRST EXAMPLE EMBODIMENT

FIG. 1 is a block diagram illustrating a functional configuration of a vegetation effect calculation device 100 according to a first example embodiment. The vegetation effect calculation device 100 is a vegetation effect calculation device that calculates an effect on stability of a slope by vegetation. The vegetation effect calculation device 100 includes at least an input/output (I/O) unit 110, a correction value calculation unit 120, and a correction unit 130.

The I/O unit 110 acquires a moisture content of the slope, and a relational expression between the moisture content and an adhesion of soil in the slope, an optimum moisture content ratio in the slope, and an adhesion of the vegetation (vegetation adhesion) growing abundantly on the slope (hereinafter, vegetation). The vegetation adhesion is a force of the vegetation joining soil layers. The vegetation adhesion may be referred to as a soil binding force or a binding force. The vegetation adhesion is one of parameters indicating an effect on the stability of the slope by the vegetation. As the vegetation adhesion becomes larger, the slope becomes harder to slide.

The correction value calculation unit 120 calculates a correction value, using the moisture content of the slope, and the relational expression between the moisture content and the adhesion of the soil in the slope, which are acquired from the I/O unit 110.

The correction unit 130 calculates a corrected vegetation adhesion, using the vegetation adhesion acquired from the I/O unit 110 and the correction value calculated by the correction value calculation unit 120.

Figure 2:
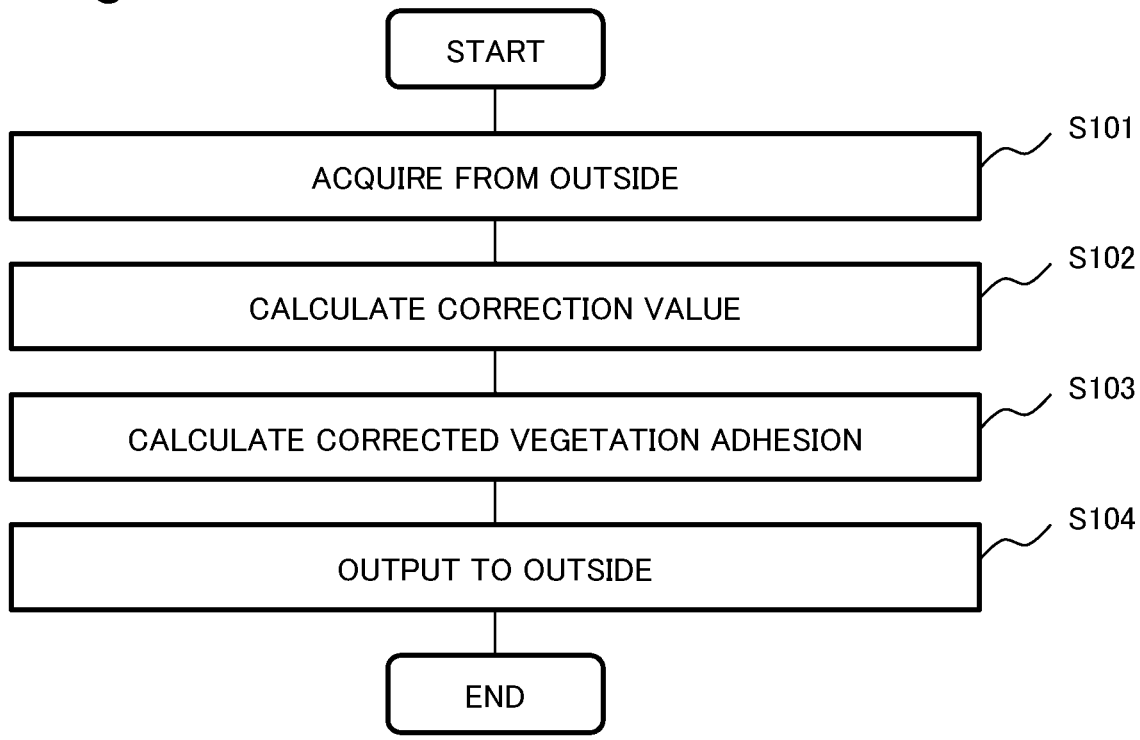
FIG. 2 is a flowchart illustrating one example of operation of the vegetation effect calculation device 100 according to the first example embodiment.

FIG. 2 is a flowchart illustrating one example of operation of the vegetation effect calculation device 100 according to the first example embodiment. In the vegetation effect calculation device 100, execution order of the steps illustrated in FIG. 2 may be made different in a range where no discord is caused in effects and actions.

The I/O unit 110 acquires the moisture content of the slope, the relational expression between the moisture content and the adhesion of the soil in the slope, and the optimum moisture content ratio in the slope, and the vegetation adhesion (step S101).

At this time, the I/O unit 110 may acquire the data from a storage medium not illustrated inside the vegetation effect calculation device 100, or may acquire the data from a device or the like outside the vegetation effect calculation device 100. Further, the I/O unit 110 sends, to the correction value calculation unit 120, the moisture content of the slope, the relational expression between the moisture content and the adhesion of the soil in the slope, and the vegetation adhesion, which have been acquired.

Alternatively, the I/O unit 110 may send the moisture content of the slope, the relational expression between the moisture content and the adhesion of the soil in the slope, and the vegetation adhesion, which have been acquired, temporarily via a recording medium or the like in place of sending them directly to the correction value calculation unit 120.

The correction value calculation unit 120 calculates the correction value for correcting the vegetation adhesion, using the moisture content of the slope, the relational expression between the moisture content and the adhesion of the soil in the slope, and the optimum moisture content ratio, which have been acquired through the I/O unit 110 (step S102). As one of methods for finding the correction value, for example, there is a method of finding a ratio of "the adhesion of the soil of the slope having the moisture content at the measuring time" to "the adhesion of the soil of the slope in a state where the soil is the hardest by containing the moisture (hereinafter, referred to as an optimum moisture content state)". Moreover, as another method for finding the correction value, there is a method of finding a ratio of "a shearing stress of the soil of the slope having the moisture content at the measuring time" to "a shearing stress of the soil of the slope in the optimum moisture content state". In the case where the correction value is found in this method, the correction value calculation unit 120 acquires, through the I/O unit 110, "the shearing stress of the soil of the slope having the moisture content at the measuring time" and "the shearing stress of the soil of the slope in the optimum moisture content state".

The correction unit 130 calculates the corrected vegetation adhesion, using the vegetation adhesion acquired by the I/O unit 110, and the correction value calculated by the correction value calculation unit 120 (step S103).

As one of the simplest methods for finding the corrected vegetation adhesion, for example, there is a method of using a product of the vegetation adhesion and the correction value.

The correction unit 130 outputs the corrected vegetation adhesion, which has been calculated, to an outside (step S104). The corrected vegetation adhesion is used for, for example, calculation of a safety factor in another device.

The foregoing is one example of the operation of the vegetation effect calculation device 100 according to the first example embodiment. According to the present example embodiment, changes in effect on the stability of the slope by the vegetation, depending on the moisture content can be calculated.

SECOND EXAMPLE EMBODIMENT

Figure 3:
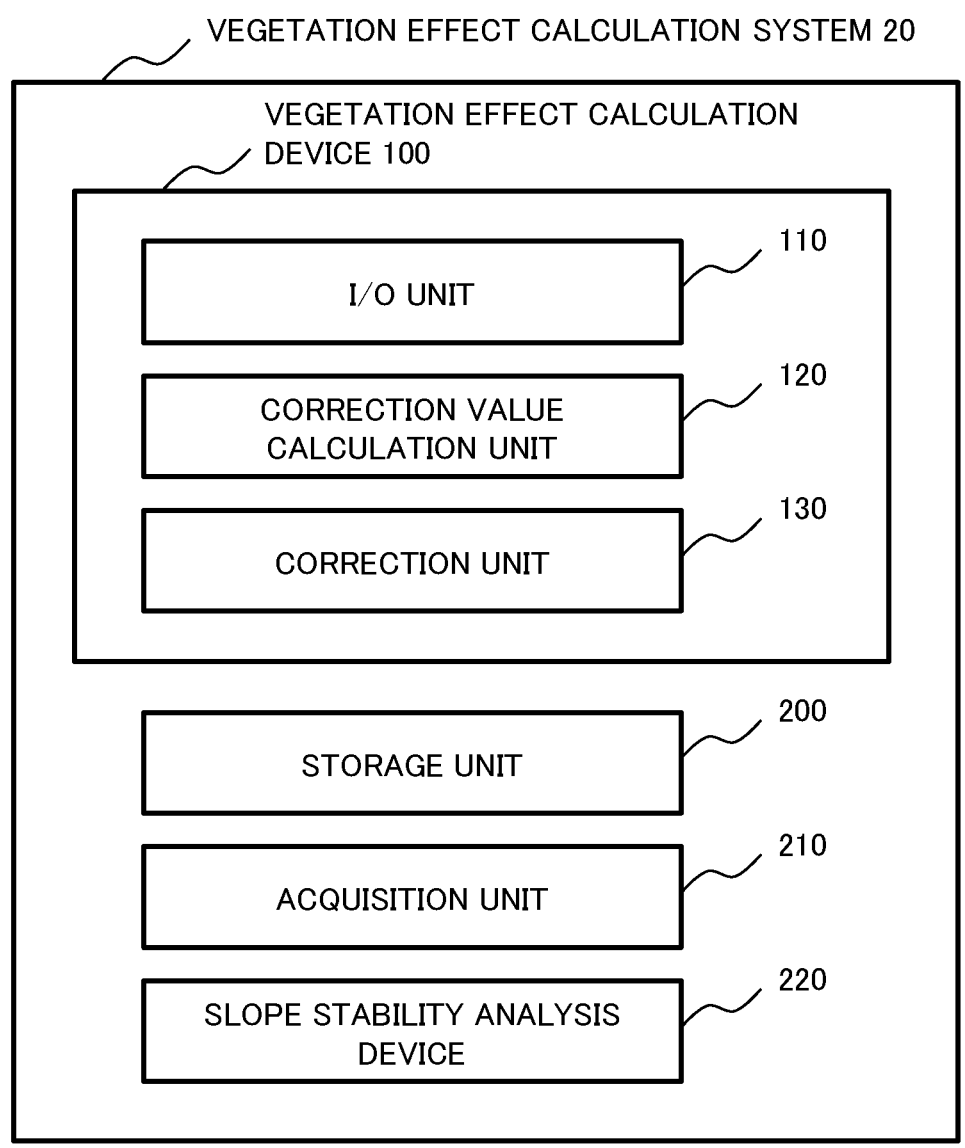
FIG. 3 is a block diagram illustrating a configuration of a vegetation effect calculation system 20 according to a second example embodiment.

FIG. 3 is a block diagram illustrating a configuration of a vegetation effect calculation system 20 according to a second example embodiment. The vegetation effect calculation system 20 is a system that optimizes an effect on stability of a slope by vegetation. The vegetation effect calculation system 20 includes a vegetation effect calculation device 100, a storage unit 200, an acquisition unit 210, and a slope stability analysis device 220. The vegetation effect calculation device 100 includes at least an I/O unit 110, a correction value calculation unit 120, and a correction unit 130.

The storage unit 200 records a relational expression between a moisture content and an adhesion of soil for each slope, an optimum moisture content ratio for each slope, and a vegetation adhesion for each slope in advance. The storage unit 200 need not be necessarily a single recording medium, but may be configured of a plurality of separate recording media.

The acquisition unit 210 acquires a moisture content m and the vegetation adhesion of the slope, and records the same on the storage unit 200.

The slope stability analysis device 220 calculates a safety factor of a slope in a predetermined district, using a corrected vegetation adhesion. The predetermined district is, for example, a district where sediment disaster such as a slope failure or the like easily occurs.

Figure 4:
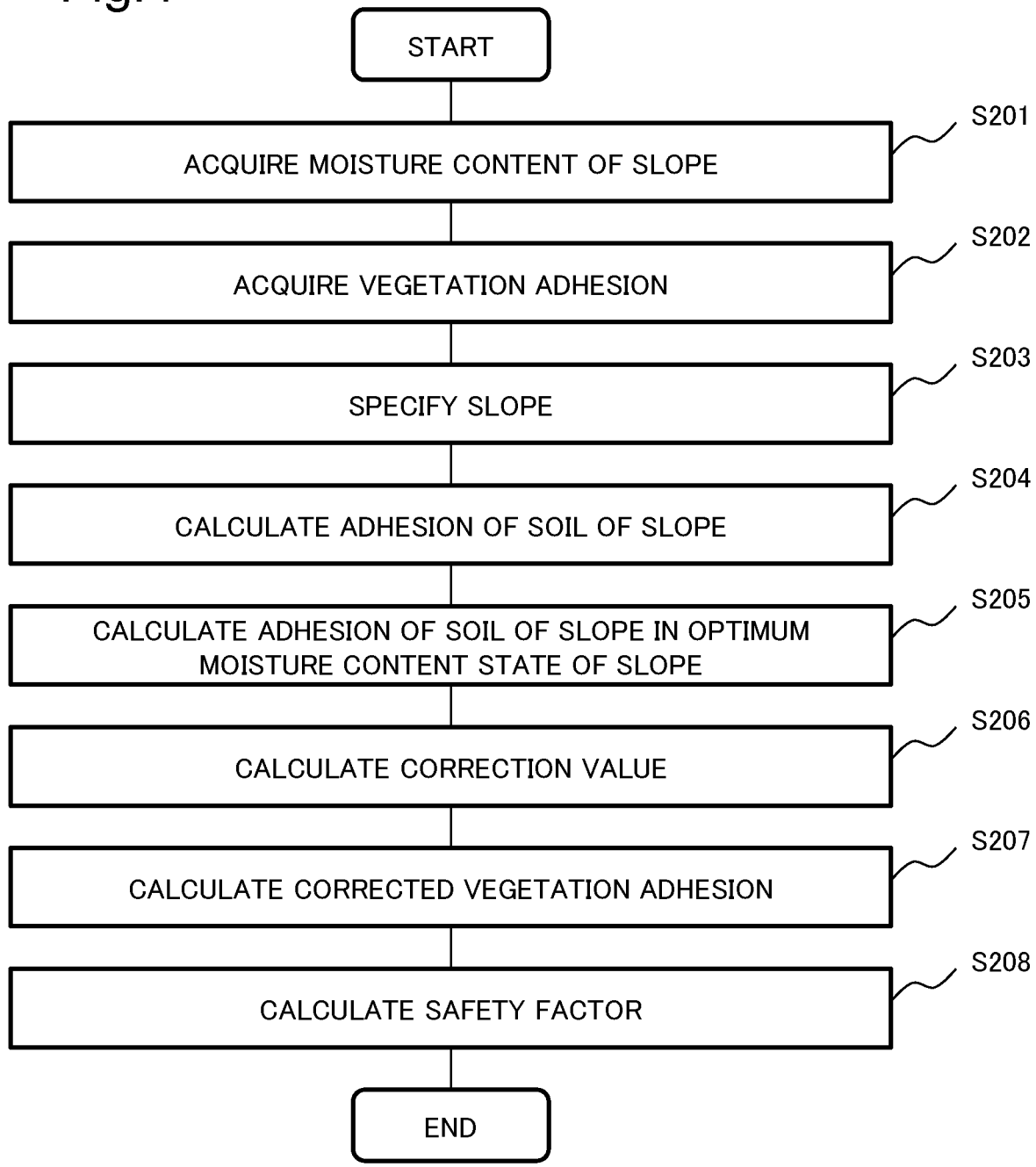
FIG. 4 is a flowchart illustrating one example of the operation of the vegetation effect calculation system 20 according to the second example embodiment.

FIG. 4 is a flowchart illustrating one example of operation of the vegetation effect calculation system 20 according to the second example embodiment.

The acquisition unit 210 acquires the moisture content m of the slope from a sensor such as a moisture meter or the like installed in the slope, and records the same in the storage unit 200 (step S201).

Moreover, the acquisition unit 210 acquires the vegetation adhesion, and records the same on the storage unit 200 (step S202). At this time, the acquisition unit 210 may acquire the data from the storage medium not illustrated inside the vegetation effect calculation system 20, or may be acquire the data from another device or the like outside the vegetation effect calculation system 20.

The correction value calculation unit 120 acquires, through the I/O unit 110, the moisture content m of the slope recorded on the storage unit 200. The correction value calculation unit 120 specifies the slope from the moisture content m of the slope (step S203).

The correction value calculation unit 120 acquires, through the I/O unit 110, the relational expression between the moisture content and the adhesion of the soil in the specified slope, which has been recorded on the storage unit 200. The correction value calculation unit 120 calculates an adhesion $Cs(m)$ of the soil of the specified slope from the moisture content m of the slope, and the relational expression between the moisture content and the adhesion of the soil in the specified slope (step S204).

The correction value calculation unit 120 acquires, through the I/O unit 110, the optimum moisture content ratio in the specified slope, which has been recorded on the storage unit 200. The correction value calculation unit 120 calculates an adhesion $Cs(m_{opt})$ of the soil of the slope in the optimum moisture content state of the specified slope from the optimum moisture content ratio in the specified slope, and the relational expression between the moisture content and the adhesion of the soil in the specified slope (step S205).

The correction value calculation unit 120 calculates a correction value $Cs(m)/Cs(m_{opt})$ for correcting the vegetation adhesion from the adhesion $Cs(m)$ of the soil of the specified slope, and the adhesion $Cs(m_{opt})$ of the soil of the slope in the optimum moisture content state of the specified slope, the adhesion $Cs(m)$ having been calculated in step S204, and the adhesion $Cs(m_{opt})$ having been calculated in step S205 (step S206).

The correction unit 130 acquires, through the I/O unit 110, the vegetation adhesion in the specified slope, which has been recorded on the storage unit 200. The correction unit 130 calculates the corrected vegetation adhesion from the vegetation adhesion, and the correction value $Cs(m)/Cs(m_{opt})$ calculated in step S206 (step S207). Further, the correction unit 130 records, through the I/O unit 110, the corrected vegetation adhesion, which has been calculated on the storage unit 200.

The slope stability analysis device 220 acquires, through the I/O unit 110, the corrected vegetation adhesion in the specified slope, which has been recorded on the storage unit 200. The correction unit 130 calculates the safety factor in the specified slope, using the corrected vegetation adhesion (step S208).

The foregoing is one example of the operation of the vegetation effect calculation system 20 according to the second example embodiment. According to the present example embodiment, the changes in the effect on the stability of the slope by the vegetation, depending on the moisture content can be calculated. Further, according to the present example embodiment, the more precise slope stability analysis can be performed.

(Hardware Configuration)

Figure 5:
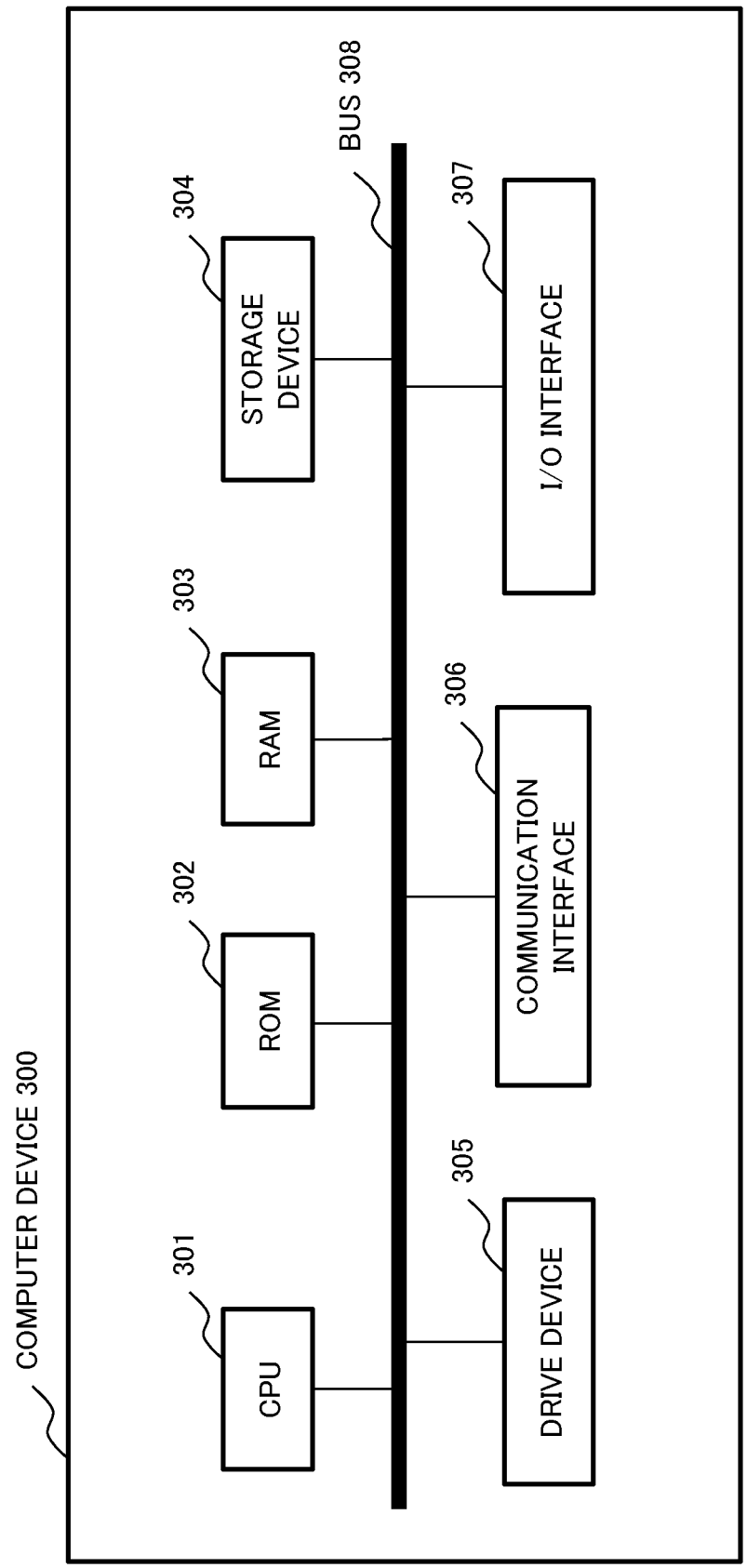
FIG. 5 is a block diagram illustrating one example of a hardware configuration of a computer device 300 according to the example embodiments.

FIG. 5 is a block diagram illustrating one example of a hardware configuration of a computer device 300 according to the example embodiments. The computer device 300 is one example of a device that implements the above-described vegetation effect calculation device 100 and the slope stability analysis device 220. The computer device 300 includes a central processing unit (CPU) 301, a read only memory (ROM) 302, a random access memory (RAM) 303, a storage device 304, a drive device 305, a communication interface 306, and an I/O interface 307. The CPU 301, the ROM 302, the RAM 303, the storage device 304, the drive device 305, the communication interface 306, and the I/O interface 307 are connected to one another through a bus 308. The vegetation effect calculation device 100 and the slope stability analysis device 220 may be implemented by a configuration (or a part thereof) illustrated in FIG. 5.

The CPU 301 executes a program, using the RAM 303. The CPU 301, the RAM 303, and the program can function as calculating means. The program may be stored in the ROM 302. Moreover, the program may be recorded on a recording medium such as a flash memory or the like and be read from the drive device 305, or may be transmitted from an external device through a network. The communication interface 306 exchanges the data with the external device through the network. The I/O interface 307 exchanges the data with peripheral equipment (an input device, a display device, a measuring instrument, a sensor, and the like). The communication interface 306 and the I/O interface 307 can function as a means for acquiring or outputting the data.

Note that a functional part of each of the I/O unit 110, the correction value calculation unit 120, the correction unit 130, the acquisition unit 210, and the like may be configured of a single circuitry (a processor or the like), or may be configured of a combination of a plurality of circuitries. The circuitry here may be either a dedicated one or a generic one. Moreover, the I/O unit 110, the correction value calculation unit 120, the correction unit 130, the acquisition unit 210, and the like may be configured of a single circuitry.

The disclosed invention is not limited to the above-described example embodiments, and various modifications can be made in the scope of the invention described in the claims, and obviously, these modifications may be included in the scope of the disclosed invention. Various aspects that a person skilled in the art can understand can be applied in the scope of the disclosed invention.

REFERENCE SIGNS LIST 100 vegetation effect calculation device
110 input/output (I/O) unit
120 correction value calculation unit
130 correction unit
20 vegetation effect calculation system
200 storage unit
210 acquisition unit
220 slope stability analysis device
300 computer device
301 central processing unit (CPU)
302 read only memory (ROM)
303 random access memory (RAM)
304 storage device
305 drive device
306 communication interface
307 I/O interface
308 bus

The invention claimed is:

1. A vegetation effect calculation device comprising:
a memory configured to store instructions; and
at least one processor configured to execute the instructions to:
acquire a moisture content of a slope, a relational expression between the moisture content and an adhesion of soil in the slope, and a vegetation adhesion that is an adhesion of vegetation abundantly growing in the slope;
calculate a correction value, using the acquired moisture content of the slope, and the acquired relational expression between the moisture content and the adhesion of the soil; and
calculate a corrected vegetation adhesion, using the acquired vegetation adhesion, and the calculated correction value.

2. The vegetation effect calculation device according to claim 1,
the at least one processor configured to execute the instructions to:
acquire an optimum moisture content ratio in the slope, and
calculate the correction value, using the acquired moisture content of the slope, the acquired relational expression between the moisture content and the adhesion of the soil, and the optimum moisture content ratio.

3. A method for calculating a vegetation effect, comprising:
acquiring a moisture content of a slope, a relational expression between the moisture content and an adhesion of soil in the slope, and a vegetation adhesion that is an adhesion of vegetation abundantly growing on the slope;
calculating a correction value, using the acquired moisture content of the slope, and the acquired relational expression between the moisture content and the adhesion of the soil; and
calculating a corrected vegetation adhesion, using the acquired vegetation adhesion, and the calculated correction value.

4. A non-transitory computer readable storage medium that stores a program configured to cause a computer to function as:
means for acquiring a moisture content of a slope, a relational expression between the moisture content and an adhesion of soil in the slope, and a vegetation adhesion that is an adhesion of vegetation abundantly growing on the slope;
means for calculating a correction value, using the acquired moisture content of the slope, and the acquired relational expression between the moisture content and the adhesion of the soil; and
means for calculating a corrected vegetation adhesion, using the acquired vegetation adhesion, and the calculated correction value.

* * * * *